United States Patent

Jayaram

(10) Patent No.: US 7,118,620 B2
(45) Date of Patent: Oct. 10, 2006

(54) INKJET INKS WITH PARTICULATE ADDITIVE

(75) Inventor: Mohanram Jayaram, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 10/640,191

(22) Filed: Aug. 13, 2003

(65) Prior Publication Data

US 2005/0034630 A1    Feb. 17, 2005

(51) Int. Cl.
*C09D 11/02*    (2006.01)

(52) U.S. Cl. .................................... 106/31.65

(58) Field of Classification Search ............... 106/31.65
See application file for complete search history.

(56) References Cited

U.S. PATENT DOCUMENTS

| | | | |
|---|---|---|---|
| 4,680,058 A * | 7/1987 | Shimizu et al. | 106/31.65 |
| 4,836,852 A | 6/1989 | Knirsch et al. | |
| 5,190,582 A | 3/1993 | Shinozuka et al. | |
| 5,221,332 A | 6/1993 | Kohlmeier | |
| 5,531,818 A | 7/1996 | Lin et al. | |
| 5,598,195 A * | 1/1997 | Okamoto et al. | 347/55 |
| 5,686,725 A * | 11/1997 | Maruyama et al. | 250/271 |
| 5,837,041 A * | 11/1998 | Bean et al. | 106/31.6 |
| 5,942,027 A | 8/1999 | Ikai et al. | |
| 5,972,087 A | 10/1999 | Uraki et al. | |
| 6,277,183 B1 | 8/2001 | Johnson et al. | |
| 2003/0041777 A1 | 3/2003 | Karl et al. | |
| 2003/0131755 A1 * | 7/2003 | Chen et al. | 106/31.6 |

FOREIGN PATENT DOCUMENTS

WO    WO 03/014237 A1    2/2003

OTHER PUBLICATIONS

Valeria Tohver, James E. Smay, Alan Braem, Paul V. Braun and Jennifer A. Lewis, Nanoparticle halos: A new colloid stabilization mechanism, PNAS Early Edition (internet publication), approved May 25, 2001 pp. 1–5.

* cited by examiner

*Primary Examiner*—J. A. Lorengo
*Assistant Examiner*—Veronica F. Faison
(74) *Attorney, Agent, or Firm*—John Brady

(57) ABSTRACT

To reduce show through, particularly for color pigments, a particulate negative metal oxide. Specifically in an anionic ink, tin oxide of primary particle size in the range of about 10 to 30 nm, is incorporated in inkjet inks in amount of less than 2 percent by weight of the total weight of the ink.

4 Claims, No Drawings

INKJET INKS WITH PARTICULATE ADDITIVE

TECHNICAL FIELD

This invention relates to inkjet inks providing improved print quality on plain paper, particularly with respect to fiber show through.

BACKGROUND OF THE INVENTION

Color pigmented inks used in ink jet printing usually suffer from poor paper fiber show through properties when printed on plain paper. Paper fiber show through is a print quality defect arising because of incomplete wetting of the paper fibers when pigmented inks are laid down resulting in visible white spots on solid areas of the printed image.

To overcome the paper fiber show through problem the ink has to be formulated in such a way that the residence time of ink flow along the surface of the paper is higher, so that when the fluidity of pigment particles vanish due to the loss of the ink vehicle (mainly water and humectants) the pigment particles settle down on the top surface of the plain paper thus increasing the probability to stain the fibers on the surface of the paper and reducing paper fiber show through. The two main methods used to reduce fiber show through are 1). Increasing the viscosity of the ink by increasing the humectant loading to reduce penetration. 2) Reducing the surface tension thus in turn wetting all the fibers by enhancing the spreading rate. In the latter case the mobility of ink is reduced by the spreading rate. The ink spreading causes the ink film thickness to reduce drastically thus effecting reduced mobility and uniform staining of the paper fiber.

The drawbacks of adding higher amounts of high boiling humectants to increase viscosity are the slow drying rate of ink thus worsening the smear properties of ink on paper and poor jetting characteristics.

The drawbacks of reducing surface tension with pigmented ink are poor ink stability (shelf life) and poor jetting due to increased puddling of ink during jetting.

DISCLOSURE OF THE INVENTION

This invention incorporates less than about 5 percent by weight of the total weight of the inkjet ink of particulate metal oxide nanoparticles that exhibit negative charge in liquid suspension. The primary particle size of the nanoparticles is less than 200 nanometers (nm) and is preferably in the range of 10 to 30 nm.

The particulate metal oxide must be compatible with the pigment dispersion so that it does not precipitate the pigment. The pigment may be dispersed in a dispersant or may have surface characteristics, which disperse the pigment. In each case it is the dispersant or the equivalent characteristics which determine the electrical characteristic of the ink.

The following test results and examples that follow are with respect to anionic inks. Where the ink is cationic, metal oxides compatible with cationic inks would be used, for example zirconium oxide.

The preferred material for anionic inks is tin oxide. Tin oxide nanoparticles in aqueous dispersion has a pH of above 7, which is compatible with pigmented ink, which is anionic. Alternatively, zinc oxide in aqueous dispersion also has a pH above 7 and can be used with the pigmented ink of interest. Positively charged materials with pH below 7 would not be compatible with an anionic pigment suspension in water.

Drastic reduction of fiber show through of color pigmented inks on plain paper is achieved with the incorporation of the metal oxide.

DESCRIPTION OF THE PREFERRED EMBODIMENTS

After a thorough investigation into the problem, it has been discovered that the paper-fiber-show-through problem is not as random as it was previously assumed.

Usually plain paper is made from two types of fibers namely, hardwood fibers and soft wood fibers. The softwood fibers are added during the paper manufacturing process to enhance the strength of paper. And hardwood fibers are added to enhance the printability of paper. The softwood fibers are longer and 5-10 times wider than the hardwood fiber. And softwood fibers are smoother than the hardwood fibers. Thus, when fine drops of pigmented inks are laid down on the plain paper surface containing a blend of these fibers, the ink pigment particles tend to come to rest on the rough and narrow fibers of hardwood than on the smoother, wider softwood fibers. The chemical compositions of the two types of fibers are the same.

Thus the problem seems to be solely dependent on the matrix formed by the fibers and the porosity of the paper. The paper made out of a higher percent of hardwood fiber forms a tighter matrix compared to the paper made out of a higher amount of softwood. And thus paper acts as a filter for the pigment particles thus facilitating ink flow along the surface of the paper rather than into the paper in hardwood rich papers enhancing pigment staining of the top surface fibers of the paper and reducing paper fiber show through.

The present invention may employ the SN15 or SN15ES aqueous nano dispersion of tin oxide particles from Nyacol Nano Technologies. The two do not differ chemically, but SN15ES has a lower viscosity.

The nano dispersions is added in the formulation to enhance the drag forces involved during flow thus increasing the residence time of ink flow along the paper and thus reducing the paper fiber show through. It is believed that the affinity of these nanoparticles to penetrate along with the ink vehicle into the paper matrix is quite low compared to the affinity of the pigment particles attached to the dispersant to penetrate along with the ink vehicle.

Thus the nanoparticles increase the drag forces significantly and prevent the pigment particles from penetrating into the paper. In other words they facilitate the separation of the pigment particles from the vehicle when the ink drop impacts the paper, thus helping the pigment particles to stay on top of the paper and in turn increase the probability of staining the paper fibers on the top surface of the paper resulting in reduced fiber show through.

Due to the extremely low particle size of the SN15 nanoparticles (10–30 nm), the surface area is enormously increased resulting in increased drag on a nanoscopic level. And the significantly higher surface area also means that very low amounts of this nano dispersion is sufficient to effect the desired drag to reduce the paper fiber show through problem drastically as discovered during fiber show through testing. Moreover, the SN 15 nanoparticle dispersion has similar pH and dispersion stability as the anionic pigmented inks making it an ideal choice for use in anionic pigmented ink formulations.

TESTING AND RESULTS

Different amounts (0.3%, 0.6% and 0.9% by weight) of the SN15 tin oxide nanoparticles (From Nyacol Nano Technologies) were added to the control cyan, magenta and yellow color pigmented inks in the respective ink formulations and tested for fiber show through properties on two types of plain paper. Lexmark International, Inc. Z65 tricolor printheads were used for print testing. The details of the SN15 tin oxide nanoparticle amounts (weight %) in inks, the cyan-magenta-yellow ink set combinations (with various levels of SN15 tin oxide nanoparticles) used in the Lexmark International Inc. Z65 tricolor printheads were used for print testing. The details of the SN 15 tin oxide nanoparticle amounts (weight %) in inks, the cyan-magenta-yellow ink set combinations (with various levels of SN15 tin oxide nanoparticles) used in the Lexmark International Inc. Z65 tricolor printhead and the results of paper fiber show through testing are tabulated in Table I.

The paper fiber show through was ranked based on the overall printed image with respect to paper fiber show through when printed on the plain papers (X9000 and Hammermill laser paper-HMLP). The grading was done qualitatively. The improvements were visibly significant.

TABLE I

Results of Fiber show through testing

| Details of ink in the different printhead chambers (Cyan chamber/Magenta chamber/Yellow chamber) | Fiber show through- X9000 | Fiber show through- HMLP |
| --- | --- | --- |
| Cyan control/Magenta control/Yellow control | BAD | BAD |
| Cyan (0.3% SN15)/Magenta (0.3% SN15)/Yellow (0.3% SN15) | BAD | BAD |
| Cyan (0.6% SN15)/Magenta (0.6% SN15)/Yellow (0.6% SN15) | GOOD | GOOD |
| Cyan (0.9% SN15)/Magenta (0.9% SN15)/Yellow (0.9% SN15) | EXCELLENT | EXCELLENT |

The significant improvements in color gamut volume are tabulated in Table II. The color gamut volume improvements were significant and noticeable in the printed images just as the paper fiber show through improvements.

TABLE II

Color gamut volume comparisons

| Details of ink in the different printhead chambers (Cyan chamber/Magenta chamber/Yellow chamber) | Gamut Volume- X9000 | Gamut volume- HMLP |
| --- | --- | --- |
| Cyan control/Magenta control/Yellow control | 110773 | 145152 |
| Cyan (0.3% SN15)/Magenta (0.3% SN15)/Yellow (0.3% SN15) | 114206 | 154900 |
| Cyan (0.6% SN15)/Magenta (0.6% SN15)/Yellow (0.6% SN15) | 131527 | 164780 |
| Cyan (0.9% SN15)/Magenta (0.9% SN15)/Yellow (0.9% SN15) | 151325 | 183812 |

Inks employed in the foregoing are consistent with the general technology disclosed in PCT Patent No. WO 03/014237 A1 of Akers et al. owned by the assignee of this invention. This invention can be implemented in a wide variety of inks. Color ink formulas of inks employing this invention may be based on the formulation given in the foregoing Akers application modified for firing through smaller, color nozzles and with the tin oxide addition. (The foregoing tests were conducted with somewhat different formulations). That formula in Askers is pigment, dispersant, thiodiethanol, polyethylene glycol 1000, 2-pyrrolidinone, hexanediol and water.

A representative formula of this invention is as follows:

Representative Formula

| Content | Percent by Weight |
| --- | --- |
| Pigment Blue 15:3 or Pigment Red 122 or Pigment Yellow 74 | 3 |
| Aqueous Pigment Dispersant | 1 |
| Dipropylene Glycol | 7.5 |
| Glycerol | 7.5 |
| Tin oxide nanoparticles (SN15) or | 0.9 |
| Tin oxide nanoparticles (SN15ES) | 1.3 |
| 2,4,7,9-Tetramethyl-5-decyne-4,5-diol ethoxylate (SURFYNOL 465) | 0.5 |
| Deionized water | Balance |

The preferred dispersant for the dispersed color pigment is that described in the foregoing WO 03/014237. That dispersant is a graft polymer having hydrophilic segments as the backbone comprised of a methacrylic acid polymer, or a copolymer thereof with another monomer, such as styrene sulfonic acid. It has hydrophobic segments of a polymer or copolymer containing methacrylic acid derived monomers, particularly a methacrylate ester monomer or a methacrylate ester monomer with the alkyl group replaced with a siloxyl substituent. Preferred hydrophobic segments have a monomeric hydrophobic head and a polymeric body attached to the backbone, specifically, a poly (ethylene glycol) 2,4,6-tris(1-phenylethyl)phenyl ether methancrylate moiety. The preferred dispersant also has poly(propylene glycol) 4-nonyl ether acrylate moieties and is terminated with dodecanethiol. Low HLB (Hydrophile-Lipophile Balance) values and short polymer chains are preferred, consistent with the dispersant being water soluble and the ink being stable.

SUMMARY

The invention established the use of tin oxide nanoparticles in anionic color pigmented ink formulations to reduce paper fiber show through and increase gamut volume has been reported and the same is claimed. The effectiveness of tin oxide in reducing paper fiber show through and increasing the color gamut volume when added at low concentrations (less than about 5 weight percent, preferably less than about 2 weight percent) in anionic color pigmented inks. The good dispersion stability of this material makes it a very attractive solution for anionic color pigmented ink printing applications, in overcoming paper fiber show through and increasing the color gamut volume.

The invention claimed is:

1. An aqueous, inkjet ink comprising a color pigment and water vehicle wherein the improvement comprises said ink having greater than or equal to about 0.9 percent by weight and less than 2 percent by weight of tin oxide suspended in said ink, said tin oxide having a primary particle size of less than 200 nm.

2. The inkjet ink as in claim 1 in which said primary particle size is in the range of 10 to 30 nm.

3. The inkjet ink as in claim 1 in which said ink comprises about 0.9% percent by weight of said tin oxide suspended in said ink.

4. The inkjet ink as in claim 3 in which said primary particle size is in the range of 10 to 30 nm.

* * * * *